Oct. 17, 1961  F. WHITWORTH  3,004,430
THREE-CHAMBER GAS METERS
Filed Aug. 23, 1957  3 Sheets-Sheet 3

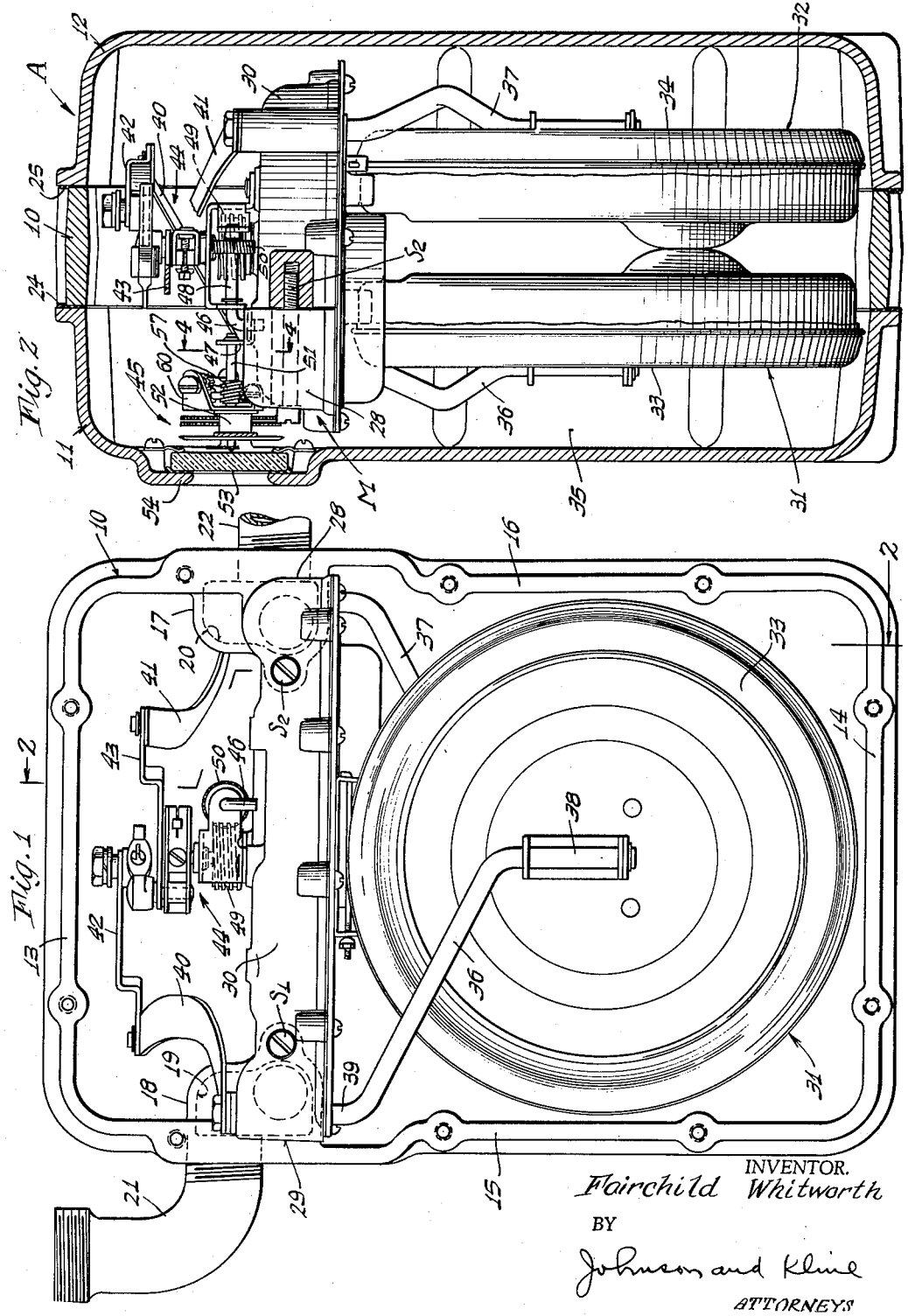

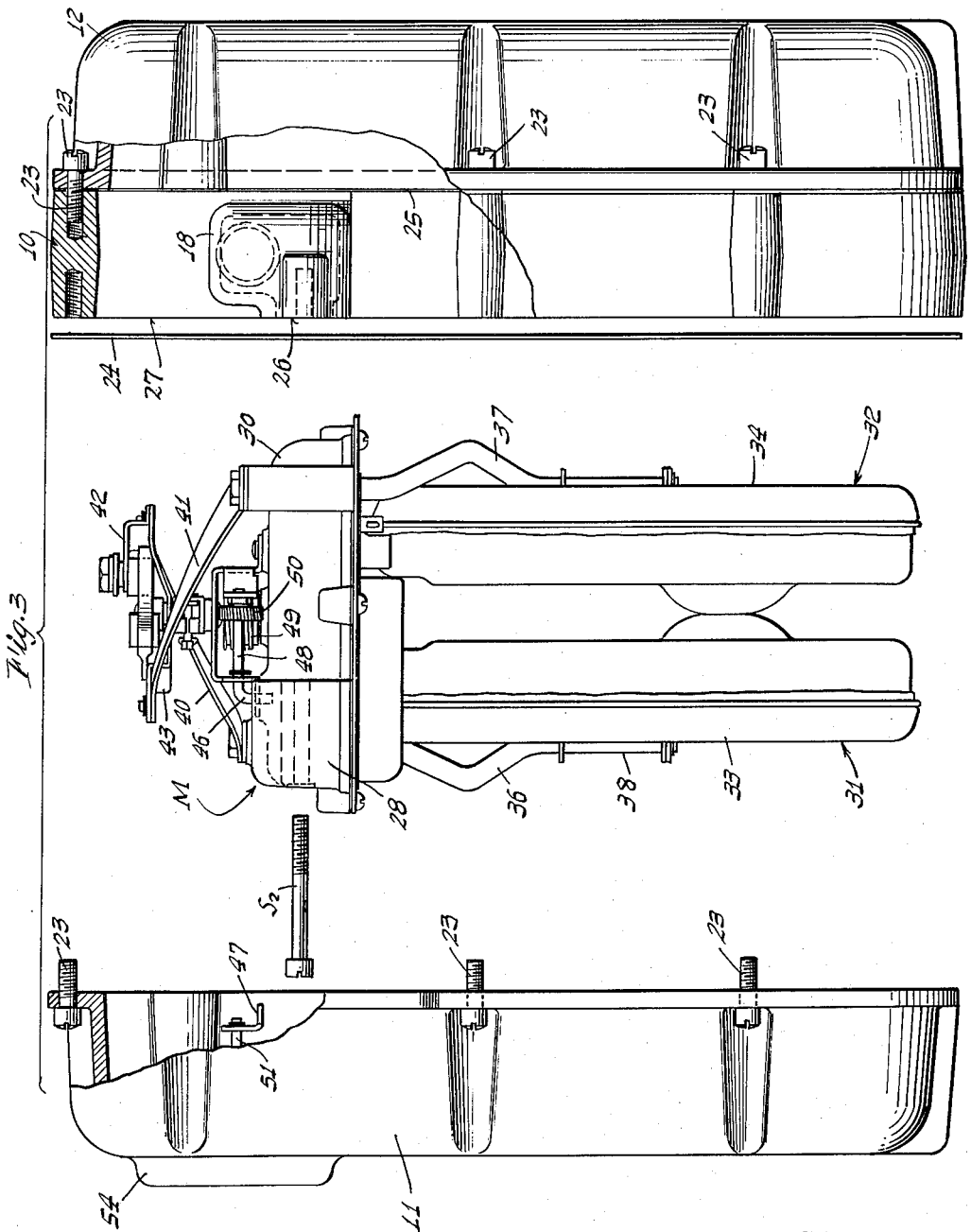

INVENTOR.
Fairchild Whitworth
BY
Johnson and Kline
ATTORNEYS

United States Patent Office 3,004,430
Patented Oct. 17, 1961

3,004,430
THREE-CHAMBER GAS METERS
Fairchild Whitworth, Fairfield, Conn., assignor, by mesne assignments, to Textron, Inc., Providence, R.I., a corporation of Rhode Island
Filed Aug. 23, 1957, Ser. No. 679,916
2 Claims. (Cl. 73—263)

This invention relates to improvements in gas meters of the three-chamber type, its general object being to provide a construction in which structure, assembly, accessibilty, and maintenance are further improved and simplified over that which is described in the copending patent application Serial No. 565,947 filed February 16, 1956, now Patent No. 2,932,198.

It is among the objects to provide an improved construction in which the mounting of a self-contained internal two-chamber metering unit within the external meter casing is simplfied and facilitated, and whereby the fastening means for this unit are made more readily accessible from the front when the unit is to be removed for servicing or repairs, in which the number of parts requiring assembly is relatively reduced, in which production cost and machining operations are reduced, in which the number of gas tight connections required is relatively reduced, and in which the control mechanism atop the valve housing is freed from encumbrances and is rendered more readily accessible and inspectable.

Still another object is to provide a casing structure with an intermediate skeleton frame carrying the metering unit with its gas inlet and gas outlet connections to afford ready access and inspection of the metering unit from all sides.

An additional object is to provide an improved construction in which the positioning of the metering unit as well as of the registering device is facilitated without disturbance of the meterng indication on the device, and to provide an improved registering unit in conjunction therewith.

In attaining these objects, the invention provides a meter casing that is vertically split preferably in a manner to provide a main intermediate casing section carrying the metering unit with its inlet and outlet gas connections, and a pair of removable cover sections. Significantly, gas inlet and gas outlet passages are disposed laterally upon the main casing section and cooperative with the corresponding inlet and outlet passages of the valve housing by way of vertical, instead of the usual horizontal, meeting faces parallel to the vertical meeting faces of the casing sections.

Horizontally extending fastening means or screw bolts readily accessible and visible from the front are provided for fixing the metering unit in cooperative position relative to the casing, instead of vertical bolts with their heads invisible and accessible only from below.

In the improved construction of this invention one of the removable cover sections contains the registering device, so that the removal of the cover section disconnects the registering device from the metering unit, the metering unit thereupon being separately disconnectable from the main casing section in the simple manner aforementioned.

Still another feature provides in the registering device a novel self-contained removable and exchangeable gear-reducing unit operatively positionable between a pair of parallel indicator shafts to effect the carry-over of the metering indications from the one indicator shaft to the vent.

Other features and advantages of the invention will be apparent from the specification and claims when considered in connection with the drawings in which:

FIGURE 1 is a front view of the gas meter without the front cover section and without the registering device contained therein.

FIG. 2 is a vertical sectional view of the gas meter taken along line 2—2 of FIG. 1.

FIG. 3 is an exploded view of the gas meter showing the front cover section containing the registering device and the metering unit separated from each other as well as from the main casing section.

Figure 4:
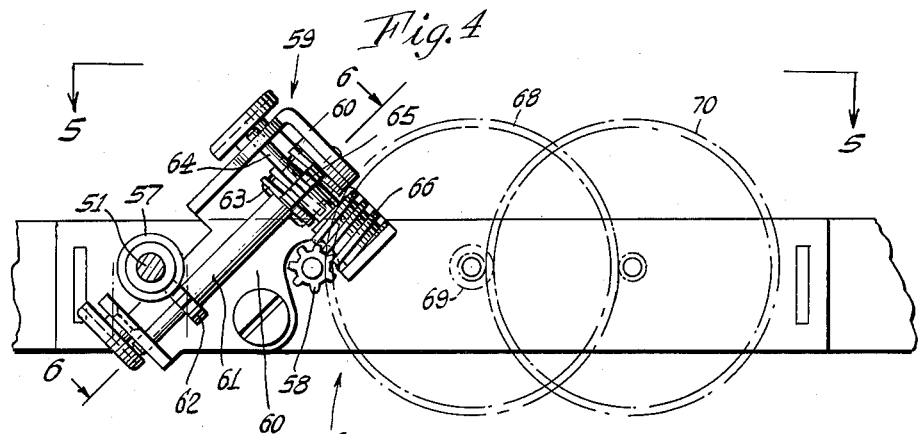
FIG. 4 is a detail sectional view taken along line 4—4 of FIG. 2.

The improved mounting of the self-contained two-chamber metering unit of this invention is in contrast with the manner of mounting such a unit shown in the aforementioned copending patent application, where the surrounding meter casing constitutes the usual third metering chamber. In the earlier construction dismounting the internal metering unit required the loosening of vertical screw bolts holding the unit connected upwardly by way of horizontal meeting faces to the gas inlet and gas outlet passages in the meter casing.

The earlier construction with the meeting faces extending in a horizontal plane required special tubular spacers or connector members extending vertically upwardly between the top of the internal unit and the external meter casing to establish the connections through the space occupied by the control mechanism. This invention eliminates these connectors and thereby reduces the number of meeting faces or gas tight connections required as between the internal unit and the external meter casing.

It will be understood that the internal two-chamber metering unit as such is known to comprise as basic components a pair of cooperating bellows-type metering chambers, a valve housing connected to the metering chambers and communicating with the external surrounding third chamber to control passage of gas to and from these chambers in the cyclic metering operation of the meter, and finally a control mechanism actuated by a pair of the so-called flag arm wires which, according to the copending application, are carried by the valve housing, thus to constitute part of the internal self-contained metering unit. The bellows furnish the power which through the flag arm wires actuates the mechanism including a control valve in the valve housing that governs the opening and closing of the passages whereby the metering cycles are established for recording by a registering device.

Referring to the accompanying drawings, in the gas meter embodying this invention a substantially box-shaped meter casing A is vertically split to provide an intermediate or middle section 10 herein also termed the skeleton frame, and a pair of cover sections 11 and 12 closing the respective open ends of the middle section. The middle section itself has a top portion 13, a bottom portion 14, and a pair of side portions 15 and 16, the side portions being formed inwardly with lugs 17 and 18 respectively to provide therein a gas inlet passage 19 and a gas outlet pasage 20 respectively having connected thereto laterally disposed angular gas inlet and gas outlet fittings 21 and 22.

The cover sections 11 and 12 close upon the middle section 10, being secured in place by means of screws 23, with gas tight gaskets 24 and 25 interposed between the respective pairs of meeting faces of the casing sections. The faces of the lugs 17 and 18 extend in a vertical plane shown to be coextensive with the associated vertical meeting faces of the respective casing sections. According to the invention, the disposal of the lugs and their gas passages is of particular significance because of the special manner of connection which they provide for the self-contained metering unit M described below. The lugs 17 and 18, it will be noted, present vertical machined faces 26 here shown to be in a plane with the respective associated vertical face 27 of the middle casing section. The metering unit M has corresponding gas inlet and gas outlet lugs 28 and 29, providing vertical companion faces for those of the lateral lugs 17 and 18 of the casing.

The metering unit M resembles the one shown and described in the copending patent application Serial No. 565,947 which may therefore be referred to for details. In its main component parts, this metering unit comprises a valve housing 30 or sealed manifold containing a valve member (not visible), a pair of metering chambers 31 and 32 at the underside of the valve housing and fixed thereto, each metering chamber having an outer wall portion in the form of a diaphragm 33 and 34 respectively, and actuating control mechanism mounted atop the valve housing 30 and operatively interconnecting the diaphragms 33 and 34 with the valve member inside the valve housing. Such a valve housing has flow passages or ports connecting it with the metering chambers 31 and 32 as well as with the surrounding outer metering chamber 35 formed by the meter casing. As is well known, the valve means controlled by this mechanism are cooperative with the ports for sequentially connecting the two inner metering chambers 31 and 32 with the outer chamber 35 as well as with the inlet and outlet openings of the valve housing to control intake and exhaust of the metering cycle.

The control mechanism above referred to is operatively connected to the diaphragms 33 and 34 by means of a pair of crank shaped flag arm wires 36 and 37, the lower vertical end portion 38 of this crank shape being journaled upon the respective diaphragms, the upper vertical end portion 39 being journaled in the valve housing. Each flag arm wire has fixedly connected to the upper free end thereof the usual flag arms 40 and 41 respectively. A pair of links 42 and 43 have their outer ends pivotally connected to the outer ends of flag arms 40 and 41 respectively, and their inner ends connected to the outer end of a vertical crank construction 44. As described in the aforementioned copending patent application, the vertical crank construction 44 is rotatable in the top of the valve housing in sealed relationship therewith to impart gyratory motion to the sliding valve member therein, thereby controlling the metering cycle of the chambers. This crank construction 44 comprises a usual vertical crank shaft journaled in the valve housing, having upon its lower end a crank imparting the gyratory motion to the valve member, and having at its upper end a crank operatively connected with the links 42 and 43, and embodying timing means for (a) adjusting the effective length of the upper crank arm to vary the metering displacement effected by the diaphragms, and (b) angularly adjusting the link-carrying crank itself to effect adjustment of the timing of the gyratory sliding valve within the valve housing. Such timing means are described in detail as to structure and operation in the aforementioned copending patent application.

A registering device 45 is mounted upon the cover section 11 and has drive connection with the above outlined control mechanism M of the metering unit through a pair of loosely interengaging coupling members 46 and 47, the coupling member 46 being part of a horizontal drive shaft 48 geared to the aforementioned vertical crank shaft of the control mechanism as through a worm 49 meshing with a gear 50 being fixed upon the horizontal shaft 48. The companion coupling member 47 is carried by a driven shaft 51 which is part of the registering device 45 and provides a dial indicator shaft $I_1$ associated with a plurality of additional dial indicator shafts $I_2$, $I_3$, $I_4$.

Figure 5:
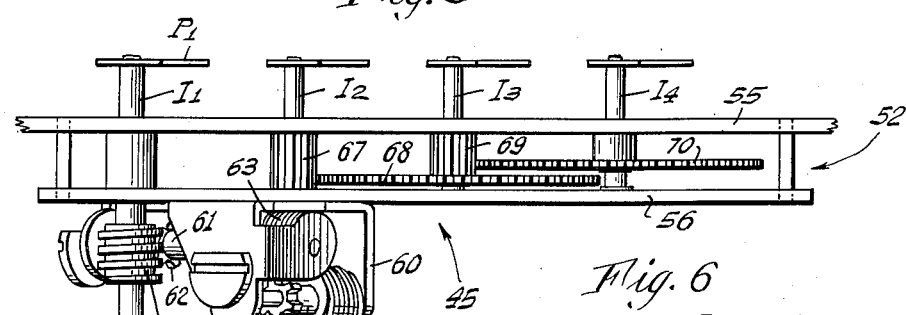
FIG. 5 is a top view taken along line 5—5 of FIG. 4.
Figure 6:
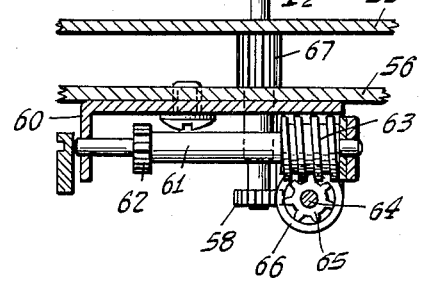
FIG. 6 is a further detailed sectional view taken along line 6—6 of FIG. 4.

According to FIGS. 2, 4, 5, 6, the registering device 45 is mounted upon the cover section 11 by means of a frame structure 52 fastened to the cover section in conjunction with a window 53 mounted gas tight in a recess or bay 54 thereof.

The registering device 45 comprises the frame structure 52 providing a pair of elongated plates 55 and 56 in fixed parallel relationship with the one plate 56 facing inwardly and the other plate 55 facing outwardly. The aforementioned indicator shafts $I_1$, $I_2$, $I_3$, $I_4$ are journaled in this frame structure 52, side by side in spaced relationship with respect to one another, the first indicator shaft $I_1$ having an input worm 57, the second indicator shaft $I_2$ having an output gear 58.

A self-contained gear reducing unit 59 comprises a bracket structure 60 mounted upon the inward facing plate 56 of the frame structure and in the space between the indicator shafts $I_1$ and $I_2$.

A first intermediate worm shaft 61 is journaled in the bracket structure, extending at right angles to the indicator shafts $I_1$ and $I_2$ and diagonally through the space between these indicator shafts. This worm shaft 61 has a gear 62 at one end meshing with the input worm 57 and also has a first intermediate worm 63. A second intermediate worm shaft 64 is also journaled on the bracket structure, extending at right angles to the first intermediate worm shaft 61 and having a second intermediate gear 65 meshing with the first intermediate worm 63 and also having a second intermediate worm 66 meshing with the output gear 58 on the second indicator shaft $I_2$. In this way, the driven shaft or indicator shaft $I_1$ carrying the first indicator pointer $P_1$ is geared to the second indicator shaft $I_2$ through the intermediate worm shafts 61 and 64 carried by the bracket structure 60, the third indicator shaft $I_3$ being geared down from the second shaft $I_2$ at a ratio defined by a pinion 67 and a gear 68, the fourth indicator shaft $I_4$ being further geared down in a similar manner as indicated by a pinion 69 and a gear 70.

Referring more particularly to the exploded view of FIG. 3 illustrating more clearly the manner of mounting and dismounting the metering unit M in accordance with the concept of this invention, that procedure is detailed as follows:

When the metering unit M is to be inspected or tested, the front cover portion 11 carrying the registering device 45 is removed from the intermediate casing section or skeleton frame 10 by loosening the screws 23. This operation also disconnects coupling member 46 from the coupling member 47, allowing the metering registrations shown on the registering device to remain intact and undisturbed so that bookkeeping entries need not be made in the user's account when the unit is changed or serviced.

The metering unit M is then removable from the intermediate section 10 by loosening the screws $S_1$ and $S_2$ as by means of a screw driver applied thereto conveniently from the front.

The removal of the cover section 11 fully exposes the front side of the internal metering unit M as well as the heads of the horizontal fastening screws $S_1$ and $S_2$ so that they can be conveniently loosened from the front. Another such metering unit can then immediately be substituted while the removed unit may be set up for testing in the service shop by being connected to a skeleton frame with gas connections similar to those from which it had been disconnected on the user's premises.

Whereas the present improvements in the mounting of the self-contained metering unit M benefit the manufacture and original assembly of the gas meter, since the units M are subject to inspecting and testing repetitiously and periodically, this benefit of shortening and simplifying the assembly operation is multiplied for every single meter in the course of time, with correspondingly great savings thus attainable.

It will further be seen that the manufacture of the casing sections is simplified because of the fact that the cover sections 11 and 12 are basically alike, being in the form of substantially identical simple tray-shaped castings, with the window recess for the registering device being the only simple deviation of the one cover section from the other. The middle casing section 10 is in the shape of a simple open-ended frame formed internally with the lugs 17 and 18 and machined on parallel sides, the lugs being faced by the identical machining operation that faces the associated vertical face of the middle casing section.

Variations and modifications may be made within the scope of the claims and portions of the improvements may be used without others.

I claim:

1. A three-chamber gas meter comprising a meter casing forming an outer gas measuring chamber vertically split to provide an open-ended middle casing section formed with lateral gas inlet and gas outlet passage means at each respective side of the casing section, said inlet and outlet passage means having passages opening in coplanar vertical surfaces lying in a plane parallel to the end of the middle section and a pair of removable cover sections closing the respective ends of the middle section, a self-contained gas measuring unit connected to and carried by the main casing section having a pair of inner gas measuring chambers the outer wall portions of which constitute flexible diaphragms, a valve housing operatively connected to said inner chambers as well as to said outer chamber and having a gas inlet and a gas outlet opening, control mechanism carried by said valve housing and operatively interconnecting the diaphragms to measure the gas passing through said chambers, said inlet and outlet openings of the housing presenting vertical meeting faces substantially in an identical plane for engaging said vertical coplanar meeting faces presented by said lateral inlet and outlet passage means of said middle casing section, and horizontally extending fastening means extending perpendicular to said plane and passing through said housing and into said middle casing section for fixing said measuring unit in cooperative relation to said main casing section with said vertical meeting faces thus engaged and said fastening means facing and readily accessible to the end of said middle casing.

2. A three-chamber gas meter comprising a meter casing forming an outer gas measuring chamber vertically split to provide an open-ended middle casing section formed with lateral gas inlet and gas outlet passage means at each respective side of the casing section, said inlet and outlet passage means having passages opening in coplanar vertical surfaces lying in a plane parallel to the end of the middle section and a pair of removable cover sections closing the respective ends of the middle section, a self-contained gas measuring unit connected to and carried by the main casing section having a pair of inner gas measuring chambers the outer wall portions of which constitute flexible diaphragms, a valve housing operatively connected to said inner chambers as well as to said outer chamber and having a gas inlet and a gas outlet opening, control mechanism carried by said valve housing and operatively interconnecting the diaphragms to measure the gas passing through said chambers, said inlet and outlet openings of the housing presenting vertical meeting faces substantially in an identical plane for engaging said vertical coplanar meeting faces presented by said lateral inlet and outlet passage means of said middle casing section, horizontally extending fastening means extending perpendicular to said plane and passing through said housing and into said middle casing section for fixing said measuring unit in cooperative relation to said main casing section with said vertical meeting faces thus engaged and said fastening means facing and readily accessible to the end of said middle casing, a registering device carried by one of said cover sections, and drive means leading from said control mechanism to operate said registering device comprising a pair of interengaging coupling members separable by the removal of the associated cover section as well as re-engageable by replacing said cover section.

References Cited in the file of this patent

UNITED STATES PATENTS

| | | |
|---|---|---|
| 722,390 | Sprague | Mar. 10, 1903 |
| 1,583,040 | Wunsch | May 4, 1926 |
| 1,645,321 | Dezendorf | Oct. 11, 1927 |
| 2,524,425 | Chester | Oct. 3, 1950 |
| 2,611,283 | Askren et al. | Sept. 23, 1952 |

FOREIGN PATENTS

| | | |
|---|---|---|
| 149,074 | Australia | Nov. 18, 1952 |

OTHER REFERENCES

"Gas Meters in the British Zone of Germany and in Berlin," British Intelligence Objective Sub-Committee Final Report No. 913, Item No. 33, 1947, copy in 73–262 (pages 6–7; 46–49).